(12) United States Patent
Szemes et al.

(10) Patent No.: US 11,909,555 B2
(45) Date of Patent: Feb. 20, 2024

(54) SYSTEM AND METHOD FOR ESTABLISHING AN INTERVEHICLE COMMUNICATION FOR AT LEAST A FIRST AND SECOND COMMERCIAL VEHICLE

(71) Applicant: KNORR-BREMSE Systeme fuer Nutzfahrzeuge GmbH, Munich (DE)

(72) Inventors: Bence Szemes, Szekszard (HU); Huba Nemeth, Budapest (HU); Tamas Konya, Paks (HU); Kristof Hillier, Gardony-Agard (HU)

(73) Assignee: KNORR-BREMSE Systeme fuer Nutzfahrzeuge GmbH, Munich (DE)

( * ) Notice: Subject to any disclaimer, the term of this patent is extended or adjusted under 35 U.S.C. 154(b) by 452 days.

(21) Appl. No.: 17/272,478

(22) PCT Filed: Aug. 6, 2019

(86) PCT No.: PCT/EP2019/071107
§ 371 (c)(1),
(2) Date: Mar. 1, 2021

(87) PCT Pub. No.: WO2020/043442
PCT Pub. Date: Mar. 5, 2020

(65) Prior Publication Data
US 2021/0328828 A1 Oct. 21, 2021

(30) Foreign Application Priority Data
Aug. 31, 2018 (EP) .................................. 18192064

(51) Int. Cl.
*H04L 12/40* (2006.01)
*H04L 9/40* (2022.01)
*H04L 12/66* (2006.01)

(52) U.S. Cl.
CPC ...... *H04L 12/40182* (2013.01); *H04L 63/061* (2013.01); *H04L 63/08* (2013.01);
(Continued)

(58) Field of Classification Search
CPC . H04L 2209/84; H04L 67/12; H04L 2209/80; H04L 63/0428; H04L 9/3226;
(Continued)

(56) References Cited

U.S. PATENT DOCUMENTS 6,501,376 B2   12/2002   Dieckmann et al.
7,760,077 B2   7/2010    Day
(Continued)

FOREIGN PATENT DOCUMENTS

JP   11-25367 A      1/1999
JP   2007-131029 A   5/2007
(Continued)

OTHER PUBLICATIONS

International Search Report (PCT/ISA/210) issued in PCT Application No. PCT/EP2019/071107 dated Oct. 4, 2019 (four (4) pages).
Written Opinion (PCT/ISA/237) issued in PCT Application No. PCT/EP2019/071107 dated Oct. 4, 2019 (six (6) pages).
Extended European Search Report issued in European Application No. 18192064.6 dated Feb. 11, 2019 (eight (8) pages).
(Continued)

*Primary Examiner* — Kharye Pope
(74) *Attorney, Agent, or Firm* — Crowell & Moring LLP

(57) ABSTRACT

A system for establishing an intervehicle communication for at least first and second commercial vehicles includes at least one wireless, wired, and/or physical communication line, wherein the communication line is bidirectional. At one point of the communication line, a first authentication code generation module is provided, which is dedicated to the first vehicle. At another point of the communication line, a
(Continued)

second code processing module is provided, which is dedicated to the second vehicle. The first authentication code generation module is configured to send identification information, authentication information, and/or encryption keys. The second code processing module is configured to process and send back identification information, authentication information, and/or encryption keys, especially processed and/or modified identification information, authentication information, encryption keys.

7 Claims, 2 Drawing Sheets

(52) U.S. Cl.
CPC ............... *H04L 2012/40215* (2013.01); *H04L 2012/40273* (2013.01)

(58) Field of Classification Search
CPC . H04L 9/3263; H04L 9/3268; H04L 63/0823; H04L 2012/4027; H04L 63/06; H04L 2012/40273; H04L 12/40182; H04W 4/48; H04W 4/46; H04W 4/40; H04W 4/44; H04W 4/80; H04W 12/03; H04W 92/18; H04W 12/069; H04W 84/12; H04W 72/02; H04W 12/50; H04W 12/041; H04W 4/42; H04M 1/72412; H04M 1/6091; H04M 1/724098; H04M 2250/02; H04M 1/6083; H04M 1/725; H04M 1/0202; H04B 1/3822; H04B 10/1143; B60R 2325/205; B60R 25/08; G08C 17/00; G08C 19/00
See application file for complete search history.

(56) References Cited

U.S. PATENT DOCUMENTS

| | | | |
|---|---|---|---|
| 9,315,212 | B1 | 4/2016 | Kyrtsos et al. |
| 2002/0030590 | A1* | 3/2002 | Dieckmann .............. B60D 1/62 340/475 |
| 2005/0062590 | A1* | 3/2005 | Lang ...................... B60D 1/62 340/431 |
| 2008/0151793 | A1* | 6/2008 | Wright .................. H04W 84/18 370/310 |
| 2009/0160629 | A1 | 6/2009 | Shimura |
| 2016/0075387 | A1 | 3/2016 | Fong et al. |
| 2016/0236523 | A1 | 8/2016 | Moreau |
| 2017/0088104 | A1 | 3/2017 | Risse et al. |
| 2017/0111798 | A1 | 4/2017 | Dieckmann et al. |
| 2017/0240153 | A1* | 8/2017 | Ripley ...................... B60T 7/20 |
| 2017/0245321 | A1* | 8/2017 | Dieckmann ........... H04W 84/18 |
| 2021/0320688 | A1 | 10/2021 | Szemes et al. |

FOREIGN PATENT DOCUMENTS

| | | |
|---|---|---|
| JP | 2016-539039 A | 12/2016 |
| JP | 2017-531585 A | 10/2017 |
| JP | 2021-535674 A | 12/2021 |
| WO | WO 2014/200414 A1 | 12/2014 |
| WO | WO-2014200414 A1 * 12/2014 ............... B60D 1/62 |

OTHER PUBLICATIONS

Japanese-language Office Action issued in Japanese Application No. 2021-510817 dated Mar. 28, 2022 with English translation (11 pages).

* cited by examiner

SYSTEM AND METHOD FOR ESTABLISHING AN INTERVEHICLE COMMUNICATION FOR AT LEAST A FIRST AND SECOND COMMERCIAL VEHICLE

BACKGROUND AND SUMMARY OF THE INVENTION

The present invention relates to a system for establishing an intervehicle communication for at least a first and a second commercial vehicle and also a method for establishing an intervehicle communication in the field of commercial vehicles.

Between the truck, trailer or multiple trailers wired communication interfaces (e.g. defined by the ISO 11992 standards) are widely used. To support the ever-growing need of data rate between vehicles in a combination of vehicles, such as truck-trailer or truck-trailer-trailer (i.e. road-train), new communication solutions emerge, some using wireless communication interface.

A critical part of establishing wireless communication between vehicles in a combination is identifying and authenticating the other party and agreeing on the encryption variables. E.g., when a truck gets attached to a trailer in a yard full of trailers, the system has to make sure that the wireless communication has been established with the trailer physically attached and not with any neighbouring ones or not with a harmful wireless station, acting like a trailer. The system also has to make sure that during that process no sensitive data can be obtained by third parties.

US 2017/111798 A1 describes, besides the wireless communication interface, a non-wireless "physical-mechanical" interface. In the described solution one vehicle is prompted via any of the communication interfaces and a response is sent via the other interface.

U.S. Pat. No. 7,760,077 B2 introduces a system between tethered vehicles in which a wireless and a wired communication system is present between the vehicles. In the described system the encryption data that would be used for the wireless communication is sent via the wired link. An asymmetric key sharing is described.

U.S. Pat. No. 6,501,376 B2 describes a system equipped with both wireless and wired communication interfaces. The identification and authentication process is carried out by a wireless signal in synchrony with a change of the wired signal.

US 2017/088104 A1 describes a system equipped with both wireless and wired communication interfaces. The identification and authentication process is carried out by a wireless signal in synchrony with a change of the wired signal.

U.S. Pat. No. 9,315,212 B1 describes a wireless identification and authentication system that authenticates the trailer by the received signal strength and sends the unique identifier in a wireless manner.

It is therefore an object of the present invention to provide a system and a method for establishing an intervehicle communication that is safe and reliable, in particular in that means for sharing authentication data, identification data or other sensitive data between vehicles in a combination can be exchanged on highest security standards and highest reliability.

This object is achieved with a system for establishing an intervehicle communication in accordance with the claimed invention. Accordingly, a system for establishing an intervehicle communication for at least a first and a second commercial vehicle is provided, comprising at least one wireless and/or wired and/or physical communication line, wherein the communication line is bidirectional, wherein at one point of the communication line a first authentication code generation module is provided, which is dedicated to the first vehicle, wherein at another point of the communication line a second code processing module is provided, which is dedicated to the second vehicle, wherein the first authentication code generation module is configured to send identification information and/or authentication information and/or encryption keys and wherein the second code processing module is configured to process and send back identification information and/or authentication information and/or encryption keys, especially processed and/or modified identification information and/or authentication information and/or encryption keys.

The invention is based on the basic idea that an intervehicle communication system between vehicles in a combination, e.g. truck-trailer or trailer-trailer in case of a road-train scenario are provided. The invention provides novel ways of authenticating, identifying the other vehicles and sharing with sensitive data. By providing a communication line, which is bidirectional from the one side and from one vehicle, data related to information whether the correct vehicles are communicating with each other, can be sent, received at the end and the second code processing module. With the second code processing module it can be checked, whether correct data are received and then send back, so that on this basis a secured and reliable communication line that has been verified and authenticated is provided and established.

The first vehicle may be a truck and the second vehicle may be a trailer. Also, other combinations may be possible. Also road-train scenarios or other combinations can be possible.

Furthermore, the first vehicle may be also a trailer and the second vehicle may be also a trailer. This is for example a scenario of a road-train. Also a truck may be attached.

The communication line may be a pneumatic line. It might be possible by means of the provided pneumatic pressure and the changes thereof to send signals over the pneumatic line.

A pneumatic line is an example for a physical communication line.

Another example for a physical communication line could be a hydraulic line. It might be possible by means of the provided hydraulic pressure and the changes thereof to send signals over the hydraulic line.

In particular, instead of or additionally to (for redundancy reasons) a pneumatic line also a hydraulic line may be used. All following samples of this disclosure may be as they relate to pneumatic line may also be embodied by means of a hydraulic line or a combination of a pneumatic line and a hydraulic line.

The first authentication code generation module and/or the second code processing module may be configured and arranged such that the identification information and/or authentication information and/or encryption keys may be transmitted by at least one pressure signal and/or a series of pressure signal, which correspond(s) to and/or represent(s) the identification information and/or authentication information and/or encryption keys. For example, the pressure signal may have a certain specific ramp from low pressure to a working pressure or high pressure or specific pressure pulses like more signals or the like can be used to provide authentication information or encryption keys or other kind of data.

Additionally and/or alternatively, the first authentication code generation module and/or the second code processing module can be configured and arranged such that the identification information and/or authentication information and/or encryption keys is/are transmitted as digital data over a wireless and/or or wired line or any other suitable kind of communication line.

Moreover, the communication line may be a wireless line. Such a wireless line may be alternatively or additionally provided. By establishing a second way of communication with a different data transmission principle, the reliability of the overall system may be enhanced.

The communication over at least one of the wireless line may be in conformity with at least one of the standards WiFi, Bluetooth, WAVE, ETSI ITS-G5, IEEE 802.15.4, C-V2X or the like. By using one of these standards, a reliable and stayable system may be established. In particular, the costs may be reduced and the transmission quality of data transmission may be enhanced by using established standards. Also standardized elements with known specifications can be used.

Additionally, the communication line may be a wired line. Such a wired line can be established between the vehicles and over the normal connections. Such a wired line can be a specific data transmission line. It is also possible, to use one of the power lines that are established between a truck and a trailer or between trailers.

The wired line may be for example an ISO 11992 CAN line. Such a use of a standardized line can be helpful and easier for implementation into existing systems or also for developing new systems.

Furthermore, the wired line may be a SAE J2497 power line.

Also, the communication line may be established optically. By this, optical glass fibers may be used. Also other solutions like lasers, mirrors or optical transceivers or repeaters can be used for data transmission.

Furthermore, the present invention relates to a method for establishing an intervehicle communication. Accordingly, the method for establishing an intervehicle communication for at least a first and a second commercial vehicle comprises at least the following steps:
  providing at least one wireless and/or wired communication line, wherein the communication line is bidirectional,
  generating a first authentication code generation at the first vehicle,
  sending identification information and/or authentication information and/or encryption keys to the second vehicle
  processing and sending back identification information and/or authentication information and/or encryption keys to the first vehicle In particular, the method may be performed by using the system as described above or herein in this disclosure.

Furthermore, the present invention relates to an authentication code generation module for a system for establishing an intervehicle communication. The authentication code generation module comprises the features of the authentication code generation module as described in this disclosure.

Additionally, the present invention relates to a code processing module for a system for establishing an intervehicle communication. The code processing module comprises the features of the code processing module as described in this disclosure.

Further details and advantages shall now be described in connection with the figures.

DETAILED DESCRIPTION OF THE DRAWINGS

Figure 1:
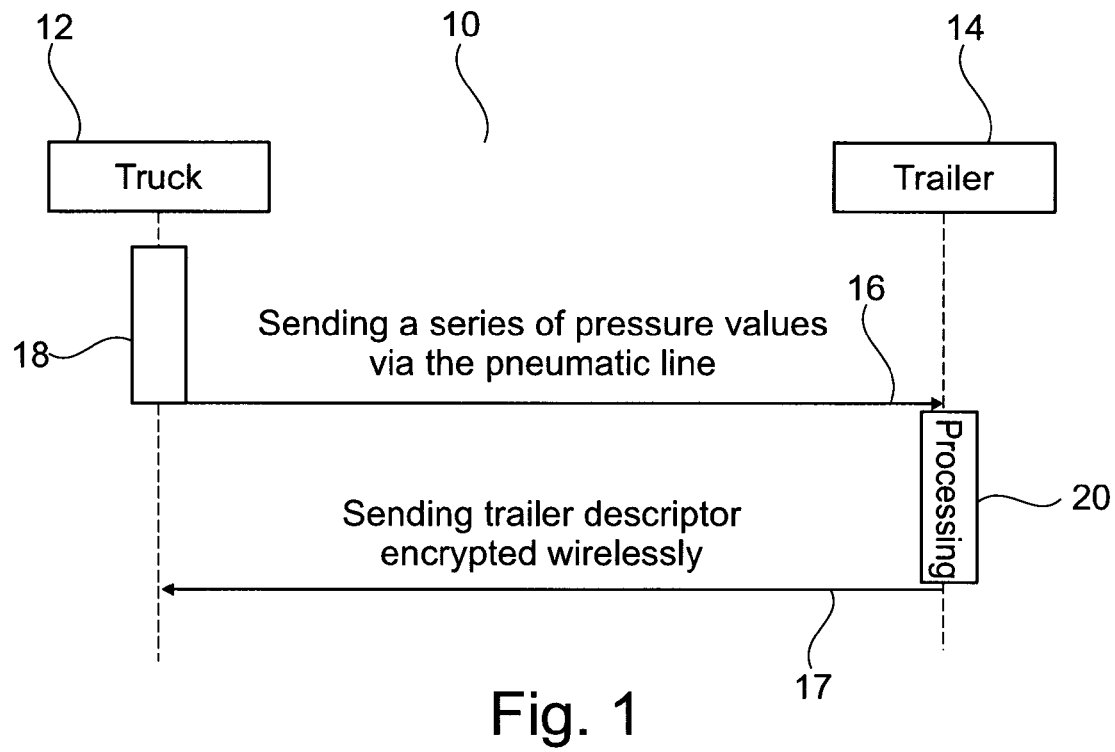
FIG. 1 is a schematic overview of how sensitive data via the pneumatic line are shared according to a first embodiment of the system and method according to the present invention.

FIG. 1 shows, in a schematic overview, how sensitive data are shared via the pneumatic line according to a first embodiment of the system 10 and method.

The system 10 for establishing an intervehicle communication is a system for at least first and second commercial vehicles, here a truck 12 as a towing vehicle and a trailer 14 being towed by the truck 12.

Between the commercial vehicles, i.e. the truck 12 and the trailer 14, there is a pneumatic line 16 controlled by the truck 12, carrying the braking information from the truck 12 to the trailer 14.

The braking information is sent in the usual way by means of pneumatic signals, such as "pressure", "no pressure", "pressure ramp", "pressure below threshold", "pressure above threshold," etc.

The system 10 comprises at least one wireless and/or wired communication line, here in this embodiment one pneumatic line 16.

The communication line, i.e. the pneumatic line 16 is bidirectional.

There is a further communication line, which is a wireless communication line 17. It can be established on the basis of the WiFi standard.

Also other standards like Bluetooth, WAVE, ETSI ITS-G5, IEEE 802.15.4, C-V2X or the like can be used for establishing a wireless communication line.

At one end of the communication line 16 a first authentication code generation module 18 is provided, which is dedicated to the first vehicle, i.e. the truck 12.

At the other end of the communication line 16 a second code processing module 20 is provided, which is dedicated to the second vehicle, i.e. the trailer 14.

The first authentication code generation module 18 is configured to send identification information and/or authentication information and/or encryption keys.

The second code processing module 20 is configured to process and send back identification information and/or authentication information and/or encryption keys, especially processed and/or modified identification information and/or authentication information and/or encryption keys.

The functionality is as follows.

The sensitive data is carried in the form of a pneumatic pressure value(s) over the communication line 16.

After connection, while the vehicles, i.e. the truck 12 and the trailer 14 stand still, from the truck 12 the first authentication code generation module 18 sends a series of pressure values via the pneumatic line 16 representing its generated encryption key used for a communication (e.g. a wired or wireless) to the other end of the pneumatic line 16 and thus to the second code processing module 20.

By reading this series of pressure value the second code processing module 20 on the trailer 14 and thus all trailer systems can obtain the encryption key and can use it for the communication. Once the "trailer 14" obtained the encryption key it sends back its descriptor in an encrypted in a wired or wireless manner according to the available communication link(s), here the wireless communication link 17.

From the fact that the message is encrypted with the right keys, the truck is assured that the source of the transmission is the correct trailer 14 that the truck 12 is connected to, since no other parties have access to the pneumatic line 16.

Figure 2:
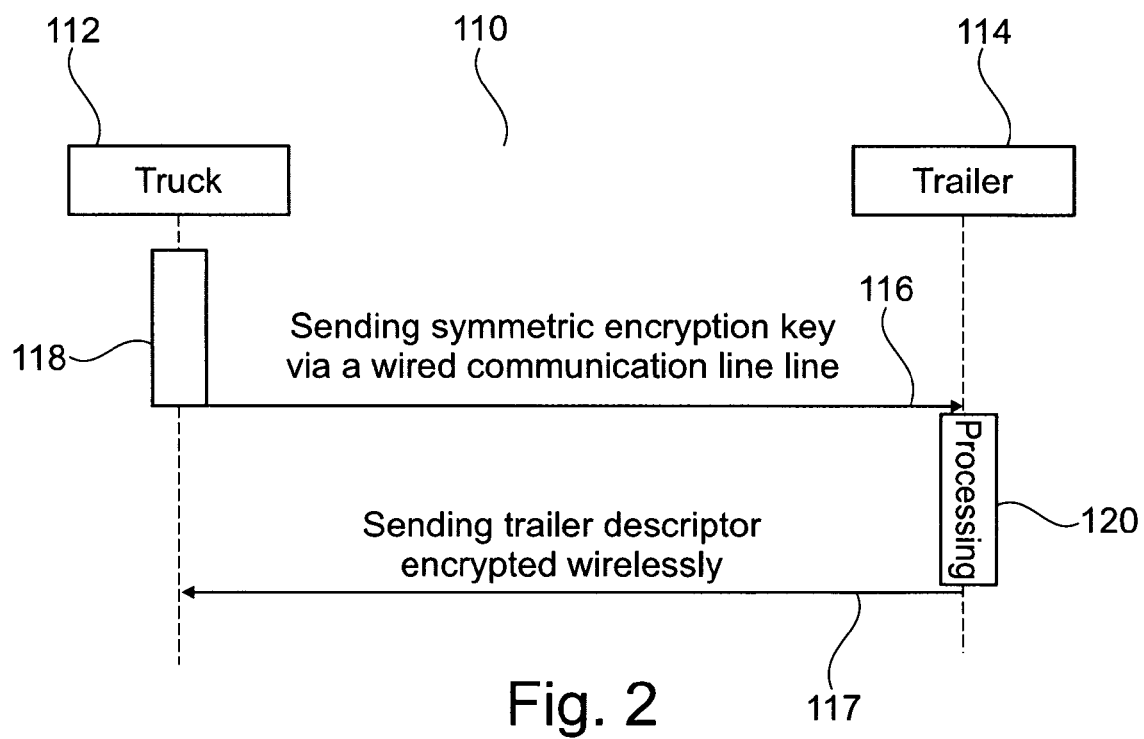
FIG. 2 is a further schematic overview of sharing symmetric encryption keys via a wired interface according to a further embodiment of the system and method according to the present invention.

FIG. 2 shows a further schematic overview of symmetric encryption keys via a wired interface according to a further embodiment of the system 110 and method according to the present invention.

In this embodiment, all structural and functional features of the system 10 as described in connection with FIG. 1 are realized and present.

Similar, identical or corresponding features are named with a reference number, where the value of 100 has been added, i.e. there is a truck 112, a trailer 114, a first communication line 116, a second communication line 117, a first authentication code generation module 118 and a second code processing module 120.

In this embodiment the truck 112 and trailer 114 have two communication lines 116, 117, here the first communication line 116 and the second communication line 117. The first communication line 116 is a wireless communication line (e.g. Wi-Fi) and the second communication line 117 is a wired communication line (e.g. CAN). In this embodiment after ignition the symmetric key used for the wireless encryption is shared via the wired interface first. Once the encryption key is shared, the wireless communication link can be set up.

The communication over the first communication line 116 could be also according to one of the standards such as Bluetooth, WAVE, ETSI ITS-G5, IEEE 802.15.4, C-V2X or the like.

The second communication line 117 can be an ISO 11992 CAN line or a SAE J2497 power line. The second communication line 117 could be also established optically.

Due to the fact that the wireless message is encrypted with the right keys, the truck 112 and the first authentication code generation module 118 are assured that the source of the wireless transmission is the trailer 114 that the truck 112 is connected to, since no other parties have access to the wired communication line 116.

Figure 3:
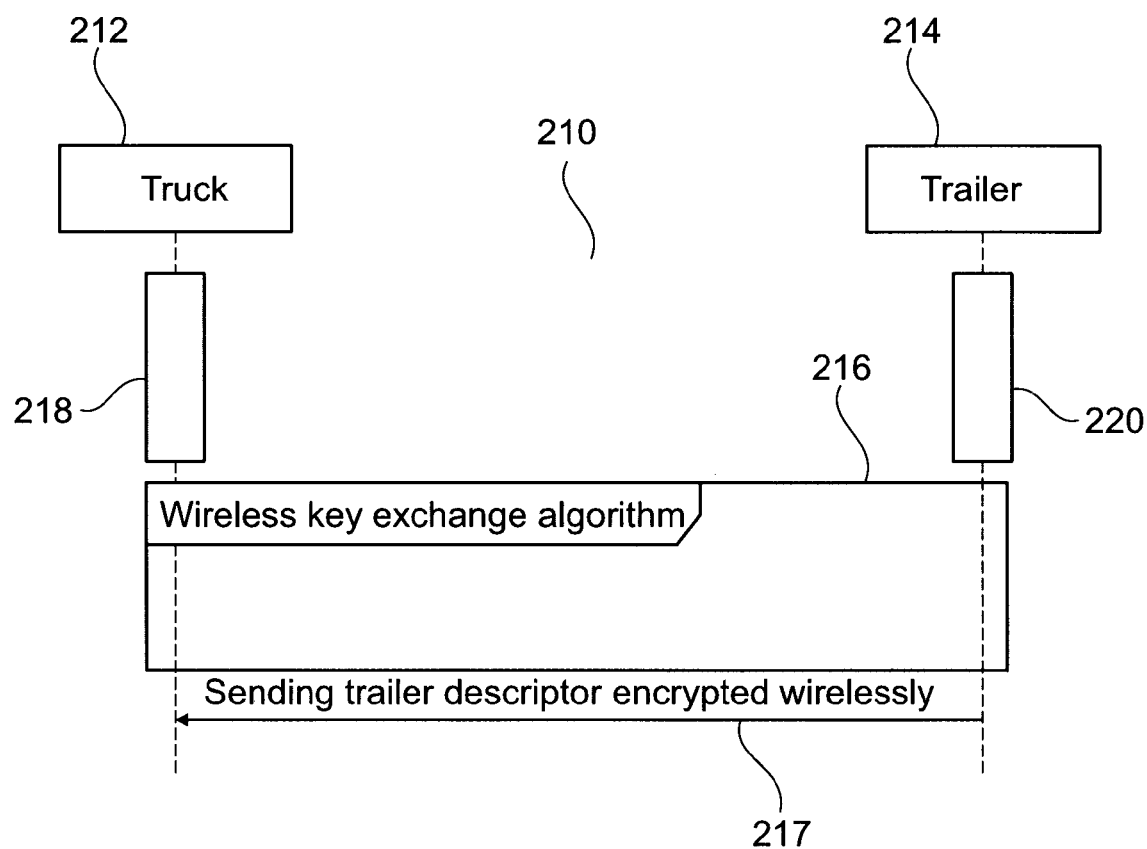
FIG. 3 is a further schematic overview of exchanging encryption keys using a wireless connection with a third embodiment of the system and method according to the present invention.

FIG. 3 shows a further schematic overview of exchanging encryption keys using a wireless connection with a third embodiment of the system 210 and method according to the present invention.

In this embodiment, all structural and functional features of the system 10 as described in connection with FIG. 1 are realized and present.

Similar, identical or corresponding features are named with a reference number, where the value of 200 has been added, i.e. there is a truck 212, a trailer 214, a first communication line 216, a second communication line 217, a first authentication code generation module 218 and a second code processing module 220.

In one embodiment the encryption keys are shared wirelessly at the very beginning of the communication, via the first communication line 216 and the second communication line 217. The method uses e.g. Diffie-Hellman or RSA key exchange algorithm. Once the encryption key has been shared, the parties encrypt their transmitted data with that key.

REFERENCES

10 System
12 Truck
14 Trailer
16 Communication line; pneumatic line
17 Communication line; wireless communication line
18 Authentication code generation module
20 Code processing module
110 System
112 Truck
114 Trailer
116 Communication line; wireless communication line
117 Communication line; wired communication line
118 Authentication code generation module
120 Code processing module
210 System
212 Truck
214 Trailer
216 Communication line; wireless communication line
217 Communication line; wireless communication line
218 Authentication code generation module
220 Code processing module

The invention claimed is:

1. A system for establishing an intervehicle communication for a first and a second commercial vehicle, comprising:
at least one physical communication line, wherein the at least one physical communication line is bidirectional;
a first authentication code generation module provided at one point of the at least one physical communication line, which the first authentication code generation module is dedicated to the first commercial vehicle;
a second code processing module provided at another point of the at least one physical communication line, which second code processing module is dedicated to the second commercial vehicle,
wherein the first authentication code generation module is configured to send identification information and/or authentication information and encryption keys, and
wherein the second code processing module is configured to process and send back processed and/or modified information and/or authentication information, and encryption keys, wherein the at least one physical communication line is a pneumatic line, wherein the first authentication code generation module and the second code processing module are configured and arranged such that the identification information and/or authentication information and encryption keys are transmitted by at least one pressure signal and/or a series of pressure signals, corresponding to and/or representing the identification information and/or authentication information and encryption keys.

2. The system according to claim 1, wherein:
the first commercial vehicle is a truck, and
the second commercial vehicle is a trailer.

3. The system according to claim 1, wherein:
the first commercial vehicle is a trailer, and
the second commercial vehicle is another trailer.

4. A method for establishing an intervehicle communication for a first and a second commercial vehicle, comprising:
providing at least one physical communication line, wherein the at least one physical communication line is bidirectional and wherein the at least one physical communication line is a pneumatic line, wherein, at one point of the at least one physical communication line, a first authentication code generation module is provided, which is dedicated to the first commercial vehicle, wherein, at another point of the at least one physical communication line, a second code processing module is provided, which is dedicated to the second commercial vehicle;

generating a first authentication code generation at the first commercial vehicle; sending, by the first authentication code generation module, identification information and/or authentication information and encryption keys to the second commercial vehicle;

processing and sending back, by the second code processing module, identification information and/or authentication information and encryption keys to the first commercial vehicle; and transmitting the identification information and/or authentication information and encryption keys by at least one pressure signal and/or a series of pressure signals, which correspond(s) to and/or represent(s) the identification information and/or authentication information and encryption keys.

5. The method according to claim 4, wherein the method is performed by using a system comprising:

the at least one physical communication line;

a first authentication code generation module provided at one point of the at least one physical communication line, which first authentication code generation module is dedicated to the first commercial vehicle;

a second code processing module provided at another point of the at least one physical communication line, which second code processing module is dedicated to the second commercial vehicle, wherein the first authentication code generation module is configured to send the identification information and/or authentication information and encryption keys, and wherein the second code processing module is configured to process and send back the identification information and/or authentication information and encryption keys, wherein the at least one physical communication line is a pneumatic line, wherein the first authentication code generation module and the second code processing module are configured and arranged such that the identification information and/or authentication information and encryption keys are transmitted by at least one pressure signal and/or a series of pressure signals, corresponding to and/or representing the identification information and/or authentication information and encryption keys.

6. An authentication code generation module for a system for establishing an intervehicle communication according to claim 1, wherein:

the authentication code generation module is configured to send identification information and/or authentication information and and/or encryption keys.

7. A code processing module for a system for establishing an intervehicle communication according to claim 1, wherein:

the code processing module is configured to process and send back processed and/or modified identification information and/or authentication information and and/or encryption keys.

* * * * *